United States Patent
Lee et al.

(10) Patent No.: US 9,485,737 B2
(45) Date of Patent: Nov. 1, 2016

(54) CONTROLLING RADIO UNITS TO TRANSMITTING SIGNAL WITH DIFFERENT TRANSMISSION POWER

(71) Applicant: KT CORPORATION, Gyeonggi-do (KR)

(72) Inventors: Ki-Ho Lee, Gyeonggi-do (KR); Yong-Gyoo Lee, Seoul (KR); Yung-Ha Ji, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 651 days.

(21) Appl. No.: 13/726,006

(22) Filed: Dec. 22, 2012

(65) Prior Publication Data

US 2013/0165169 A1    Jun. 27, 2013

(30) Foreign Application Priority Data

Dec. 26, 2011    (KR) ........................ 10-2011-0142726

(51) Int. Cl.
*H04W 52/16*    (2009.01)
*H04W 52/32*    (2009.01)
(Continued)

(52) U.S. Cl.
CPC ........... *H04W 52/04* (2013.01); *H04W 52/283* (2013.01); *H04W 52/16* (2013.01); *H04W 52/325* (2013.01); *Y02B 60/50* (2013.01)

(58) Field of Classification Search
CPC ............. H04W 52/04; H04W 52/283; H04W 52/325; H04B 7/04
See application file for complete search history.

(56) References Cited

U.S. PATENT DOCUMENTS

2003/0199275 A1* 10/2003 Sakoda ............... H04W 52/283
                                                  455/446
2004/0106412 A1*  6/2004 Laroia et al. ................ 455/448
2006/0233138 A1  10/2006 Park
(Continued)

FOREIGN PATENT DOCUMENTS

JP       2011-139442 A      7/2011
KR   10-2006-0110384 A     10/2006
(Continued)

OTHER PUBLICATIONS

Ralf Irmer et al., "Coordinated multipoint: Concepts, Performance, and Field Trial Results", IEEE Communications Magazine, Feb. 2011, pp. 102-111, vol. 49, Issue 2.

(Continued)

*Primary Examiner* — Bobbak Safaipour
*Assistant Examiner* — Devan Sandiford
(74) *Attorney, Agent, or Firm* — IP Legal Services, LLC

(57) ABSTRACT

Described embodiments provide a method for controlling radio units to transmit a signal to user equipment wherein each one of the radio units includes at least two antennas associated with a different transmission pattern. The method may include determining whether user equipment is located at an overlapping cell area of a first cell and a second cell and controlling a first radio unit in the first cell to transmit a signal to the user equipment using a first resource block and controlling a second radio unit in the second cell to transmit a reference signal associated with the first resource block with a second transmission power when the user equipment is determined as being located in the overlapping cell area. The second transmission power may be lower than a first transmission power of the first radio unit in the first cell for transmitting a reference signal using the first resource block.

18 Claims, 9 Drawing Sheets

(51) Int. Cl.
*H04W 52/04* (2009.01)
*H04W 52/28* (2009.01)

(56) References Cited

U.S. PATENT DOCUMENTS

| | | | |
|---|---|---|---|
| 2007/0147287 A1* | 6/2007 | Jalil et al. | 370/329 |
| 2008/0032726 A1* | 2/2008 | Tajima | H04L 1/0003 455/509 |
| 2009/0181673 A1 | 7/2009 | Barrett | |
| 2010/0041409 A1 | 2/2010 | Kim et al. | |
| 2010/0184449 A1 | 7/2010 | Kim et al. | |
| 2010/0238821 A1* | 9/2010 | Liu et al. | 370/252 |
| 2010/0273514 A1 | 10/2010 | Koo et al. | |
| 2010/0322171 A1 | 12/2010 | Dekorsy et al. | |
| 2011/0010768 A1* | 1/2011 | Barriga et al. | 726/11 |
| 2011/0034175 A1 | 2/2011 | Fong et al. | |
| 2011/0080896 A1* | 4/2011 | Krishnamurthy | H04W 56/0045 370/336 |
| 2011/0170422 A1* | 7/2011 | Hu et al. | 370/242 |
| 2011/0176634 A1* | 7/2011 | Yoon et al. | 375/295 |
| 2011/0183673 A1* | 7/2011 | Kishiyama et al. | 455/436 |
| 2011/0189997 A1 | 8/2011 | Tiwari et al. | |
| 2011/0195662 A1 | 8/2011 | Seo et al. | |
| 2011/0211487 A1* | 9/2011 | Han et al. | 370/252 |
| 2011/0223962 A1* | 9/2011 | Kuwahara et al. | 455/522 |
| 2011/0235608 A1* | 9/2011 | Koo et al. | 370/329 |
| 2011/0237272 A1 | 9/2011 | Gorokhov et al. | |
| 2011/0243085 A1 | 10/2011 | Seo et al. | |
| 2011/0255514 A1 | 10/2011 | Olofsson et al. | |
| 2011/0261774 A1* | 10/2011 | Lunttila et al. | 370/329 |
| 2011/0281585 A1 | 11/2011 | Kwon et al. | |
| 2012/0021738 A1 | 1/2012 | Koo et al. | |
| 2012/0028665 A1 | 2/2012 | Kwon et al. | |
| 2012/0087273 A1 | 4/2012 | Koo et al. | |
| 2012/0127934 A1* | 5/2012 | Anderson et al. | 370/329 |
| 2012/0147805 A1 | 6/2012 | Kim et al. | |
| 2012/0155307 A1* | 6/2012 | Turk et al. | 370/252 |
| 2012/0281555 A1* | 11/2012 | Gao et al. | 370/252 |
| 2012/0322497 A1* | 12/2012 | Navda et al. | 455/525 |
| 2013/0040683 A1 | 2/2013 | Siomina et al. | |
| 2013/0196678 A1* | 8/2013 | Liu | H04W 28/16 455/452.1 |
| 2014/0220997 A1* | 8/2014 | Ezaki | 455/452.2 |
| 2014/0254537 A1* | 9/2014 | Kim et al. | 370/329 |
| 2014/0307687 A1* | 10/2014 | Fujishiro et al. | 370/329 |
| 2014/0357320 A1* | 12/2014 | Lee et al. | 455/562.1 |
| 2015/0003426 A1* | 1/2015 | Lee et al. | 370/336 |

FOREIGN PATENT DOCUMENTS

| | | |
|---|---|---|
| KR | 10-2007-0085800 A | 8/2007 |
| KR | 10-2009-0073592 A | 7/2009 |
| KR | 10-2009-0101760 A | 9/2009 |
| KR | 10-2010-0082287 A | 7/2010 |
| KR | 10-2010-0084771 A | 7/2010 |
| KR | 10-2010-0100571 A | 9/2010 |
| KR | 10-2010-0110526 A | 10/2010 |
| KR | 10-2010-0131341 A | 12/2010 |
| KR | 10-2011-0084594 A | 7/2011 |
| KR | 10-1169541 B1 | 7/2012 |
| KR | 10-1206116 B1 | 11/2012 |
| WO | 2010/087619 A2 | 8/2010 |
| WO | 2010/107255 A2 | 9/2010 |
| WO | 2011/017515 A2 | 2/2011 |
| WO | 2011/022733 A2 | 2/2011 |

OTHER PUBLICATIONS

Sharp, "Considerations on precoding scheme for DL joint processing CoMP", R1-090696, 3GPP TSG RAN WG1 Meeting #56, Athens, Greece, Feb. 9-13, 2009, pp. 1-8.

Samsung, "Design Considerations for CoMP Joint Transmission", R1-093382, 3GPP TSG RAN WG1 Meeting #58, Shenzhen, China, Aug. 24-28, 2009, pp. 1-10.

* cited by examiner (A)

(B)

PCI (Physical Cell ID) = X (A)

Physical Cell ID = X+3

(B)

PCI (Physical Cell ID) = X (A)

Physical Cell ID = X+3

(B)

CONTROLLING RADIO UNITS TO TRANSMITTING SIGNAL WITH DIFFERENT TRANSMISSION POWER

CROSS REFERENCE TO PRIOR APPLICATIONS

The present application claims priority under 35 U.S.C. §119 to Korean Patent Application No. 10-2011-0142726 (filed on Dec. 26, 2011), which is hereby incorporated by reference in its entirety.

The subject meter of this application is related to U.S. patent application Ser. No. 13/726,000 filed Dec. 21, 2012, the teachings of which are incorporated herein in their entirety by reference.

FIELD OF THE INVENTION

The present invention relates to communications and, in particular, to controlling radio units to transmit a signal to user equipment in an overlapping cell area.

BACKGROUND OF THE INVENTION

A typical base station includes a digital unit, a radio unit, and an antenna in one physical system. Such a structure of a base station has limitations when optimized in a cell design. In order to optimize and improve the cell design, a digital unit and a radio unit are spatially separated and the radio unit is installed at a remote location. For example, a digital unit may be installed in a base station. Multiple radio units may be installed at remote locations with antennas and coupled to the digital unit through an optical fiber. Such structure may reduce dead-spaces or holes in coverage but cannot maximize overall radio network capacity.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, radio units may be controlled to transmit a reference signal with different transmission power when the radio units are located in adjacent cells and when the radio units transmit signals to user equipment located at an overlapping cell area of the adjacent cells.

In accordance with at least one embodiment of the present invention, a method may be provided for controlling radio units to transmit a signal to user equipment wherein each one of the radio units includes at least two antennas associated with a different transmission pattern. The method may include determining whether user equipment is located at an overlapping cell area of a first cell and a second cell and controlling a first radio unit in the first cell to transmit a signal to the user equipment using a first resource block and controlling a second radio unit in the second cell to transmit a reference signal associated with the first resource block with a second transmission power when the user equipment is determined as being located in the overlapping cell area. The second transmission power may be lower than a first transmission power of the first radio unit in the first cell for transmitting a reference signal using the first resource block.

The method may further include controlling the second radio unit to transmit a reference signal associated with other resource blocks with a third transmission power. The third transmission power may be higher than at least one of the second transmission power and the first transmission power.

A frequency selectivity scheduling process may be performed for the controlling the second radio unit to transmit a reference signal in other resource blocks with a third transmission power.

The first cell and the second cell may use same resource element pattern for transmitting a reference signal. The first cell may have a physical cell identity (PCI) of X and the second cell may have a PCI of X+3, where X is an integer number.

The determining may include receiving a signal strength value $S_a$ of an uplink signal between the user equipment and the first radio unit in the first cell, receiving a signal strength value $S_b$ of an uplink signal between the user equipment and the second radio unit in the second cell, comparing a difference of the signal strength values $S_a$ and $S_b$ with a predetermined threshold $S_{th}$, and determining whether the user equipment is located in the overlapping cell area of the first radio unit and the second radio unit based on the comparison result.

The determining may include determining that the user equipment is located in the overlapping cell area when the difference is smaller than the predetermined threshold $S_{th}$ and determining that the user equipment is not located in the overlapping cell area when the difference is greater than the predetermined threshold Sth.

The determining may include receiving a signal strength value $S_a$ of an uplink signal between the user equipment and the first radio unit in the first cell, receiving a signal strength value $S_b$ of an uplink signal between the user equipment and the second radio unit in the second cell, determine whether a ratio of the signal strength values $S_a$ and $S_b$ is in between T and 1/T, where T is a predetermined threshold, and determining whether the user equipment is located in the overlapping cell area of the first radio unit and the second radio unit when the ratio of the signal strength values Sa and Sb is in between T and 1/T.

The method may further include controlling the first radio unit in the first cell and the second radio unit in the second cell to transmit a reference signal to the user equipment with the same transmission power when the user equipment is determined as not being located in the overlapping cell area of the first cell and the second cell.

The first and second radio units may be spatially separated from a digital unit, coupled to a digital unit through a communication link, and transmit the signals to the user equipment in response to instructions of the digital unit.

The first and second radio units may transmit signals using resources based on one of orthogonal frequency division multiplexing (OFDM) and wideband code division multiple access (WCDMA).

In accordance with at least one embodiment of the present invention, an apparatus may be provided for controlling a plurality of radio units to transmit a signal to user equipment, where each of the plurality of radio units includes at least two antennas each associated with a different transmission pattern. The apparatus may include a receiving unit, a determination unit, and a controlling unit. The receiving unit may be configured to receive a signal strength value Sa of uplink signals between user equipment and a first radio unit in a first cell and to receive a signal strength value Sb of uplink signals between the user equipment and a second radio unit in a second cell. The determination unit may be configured to determine whether the user equipment is located at an overlapping cell area of the first cell and the second cell based on the received signal strength values $S_a$ and $S_b$ of uplink signals. The controlling unit may be configured to control the first radio unit in the first cell to transmit a signal to the user equipment using a first resource block and to control the second radio unit in the second cell to transmit a reference signal associated with the first resource block with a second transmission power when the user equipment is determined as being located in the overlapping cell area. The second transmission power may be lower than a first transmission power of the first radio unit in the first cell for transmitting a reference signal using the first resource block.

The controlling unit may be configured to control the second radio unit to transmit a reference signal associated with other resource blocks with a third transmission power. The third transmission power may be higher than at least one of the second transmission power and the first transmission power.

The controlling unit may be configured to control the first radio unit in the first cell and the second radio unit in the second cell to transmit a reference signal to the user equipment with the same transmission power when the user equipment is determined as not being located in the overlapping cell area of the first cell and the second cell.

In accordance with at least one embodiment of the present invention, a radio unit may be included in a first cell and include at least two antennas each associated with a different transmission pattern. Such radio unit may be configured to transmit a reference signal associated with a first resource block with a first transmission power to user equipment located in an overlapping area of the first cell and a second cell when a second radio unit in the second cell transmits signals using the first resource block. The first transmission power is lower than a second transmission power used by the second radio unit in the second cell for transmitting a reference signal.

The radio unit may be configured to transmit a reference signal associated with other resource blocks with a third transmission power. The third transmission power may be higher than at least one of the first transmission power and the second transmission power. The radio unit may be configured to transmit signals to the user equipment using a resource element pattern identical to that used by the second radio unit in the second cell.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1:
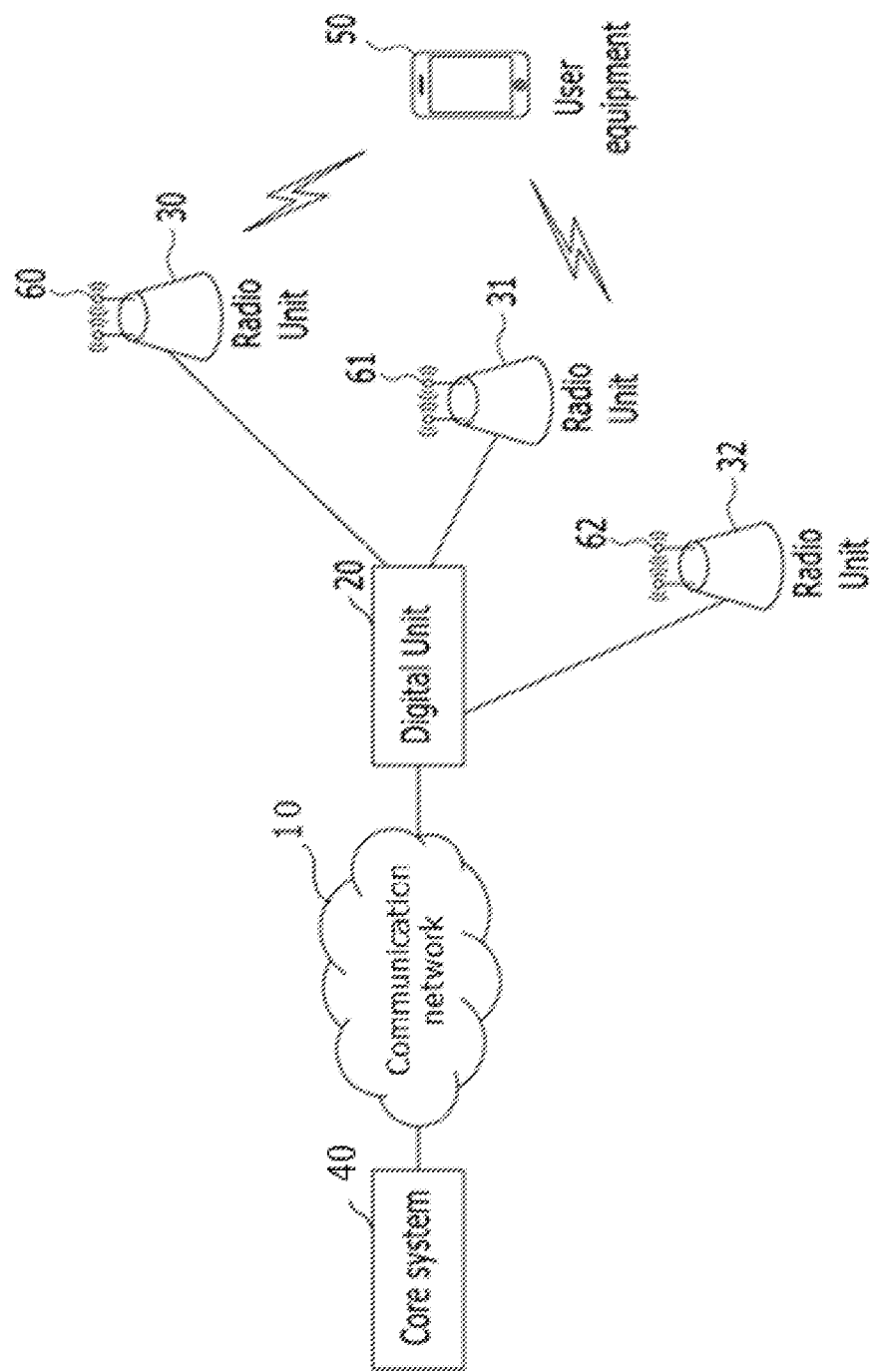
FIG. 1 shows a system in accordance with at least one embodiment of the present invention.

Reference will now be made in detail to embodiments of the present invention, examples of which are illustrated in the accompanying drawings, wherein like reference numerals refer to like elements throughout. The embodiments are described below, in order to explain the present invention by referring to the figures.

The term "user equipment" as used herein may refer to any of a terminal, a mobile station (MS), a mobile terminal (MT), a subscriber station (SS), a portable subscriber station (PSS), and an access terminal (AT), and may include some or all of the functions thereof.

The term "base station (BS)" as used herein may refer to any of an access point (AP), a radio access station (RAS), a node B, an evolved node B (eNodeB), a base transceiver station (BTS), and a mobile multihop relay (MMR)-BS, and may include some or all of the functions thereof.

FIG. 1 shows a network in accordance with at least one embodiment of the present invention.

Referring to FIG. 1, network 10 may include digital unit 20, plurality of radio units 30, 31, and 32, and core system 40 in accordance with at least one embodiment of the present invention. Network 10 may be a long term evolution (LTE) network, but the present invention is not limited thereto. Digital unit 20 may be spatially separated from plurality of radio units 30, 31, and 32 and installed at different locations in accordance with at least one embodiment of the present invention. For example, digital unit 20 may be installed in a base station (not shown) or in a digital unit center (not shown) of a central office with a switching system. Digital unit 20 may be coupled to core system 40 through communication network 70. Such digital unit 20 may be coupled to a plurality of radio units 30, 31, and 32 through an optical interface, but the present invention is not limited thereto. Digital unit 20 may be referred to as a baseband unit.

Digital unit 20 may transmit and receive signals to/from radio units 30, 31, and 32. Digital unit 20 may be constituent elements for processing signals digitally. For example, digital unit 20 may encrypt and decrypt the signals. The signals may be a radio digital signal generated based on $3^{rd}$ generation partnership project (3GPP), worldwide interoperability for microwave access (WiMAX), Wireless Broadband (WiBro), and/or long term evolution (LTE), but the present invention is not limited thereto. Digital unit 20 may be connected to core system 40 through communication network 70.

As described, digital unit 20 may be spatially separated from radio units 30, 31, and 32 and installed at different locations such as a corresponding base station and a digital unit center (not shown). Digital unit 20 may be installed at a corresponding base station (not shown) and the base station may be connected to core system 40 through communication network 70. The present invention, however, is not limited thereto. Digital unit 20 may be installed at a digital unit center (not shown). The digital unit center may include a plurality of digital units in a cloud computing center system. The digital units may be centralized in the digital unit center installed at a central office with a switching system in a cloud computing center system. Accordingly, digital unit 20 may be a virtualized base station. Digital unit 20 may be coupled to corresponding radio units 30, 31, and 32 through an optical interface, but the present invention is not limited thereto. Digital unit 20 may be coupled to a plurality of radio units 30, 31, and 32 and manage and control coupled radio units 30, 31, and 32, but the present invention is not limited thereto. Digital unit 20 may be coupled to one radio unit.

Radio units 30, 31, and 32 may be distributed and installed at various locations with corresponding antennas 60, 61, and 62. For example, radio units 30, 31, and 32 are installed with at least one antenna at each floor of an office building in accordance with embodiments of the present invention. Such a structure may enable to form various types of cells and reduce dead spaces or holes in coverage. Radio units 30, 31, and 32 may be controlled and managed by coupled digital unit 20. For example, each one of radio units 30, 31, and 32 may receive signals from digital unit 20, process the received signals, and transmit the processed signal to user equipment 50. Furthermore, radio units 30, 31, and 32 may receive signals from user equipment 50, process the received signals, and transmit the processed signals to digital unit 20. In general, radio units 30, 31, and 32 may be a set of elements for processing a radio frequency signal. For example, radio units 30, 31, and 32 may convert digital signals from digital unit 20 to a radio frequency signal according to a frequency band, amplify the radio frequency signal, and transmit the radio frequency signal through antennas (not shown). Accordingly, radio units 30, 31, and 32 may include a converter and an amplifier.

In accordance with at least one embodiment of the present invention, digital unit 20 may control signal transmission in radio units 30, 31, and 32. For example, digital unit 20 may use multiple radio units to simultaneously transmit a data signal to user equipment through a same channel when the user equipment is located in overlapping cell areas of the multiple radio units. In this case, digital unit 20 may allocate the same radio resource to related radio units to transmit a data signal to user equipment. For example, the multiple radio units may transmit the same data signal to the user equipment through the same channel in response to the control of digital unit 20.

Core system 40 may be coupled to digital unit 20 through communication network 70. Core system 40 may manage connection between digital unit 20 and an external network. Core system 40 may include a switching center (not shown). Such network 10 may form various cell structures because radio units 30, 31, and 32 with antennas 60, 61, and 62 are spatially separated from digital unit 20 and installed at different locations. Hereinafter, such cell structure in accordance with embodiments of the present invention will be described with reference to FIG. 2.

Figure 2:
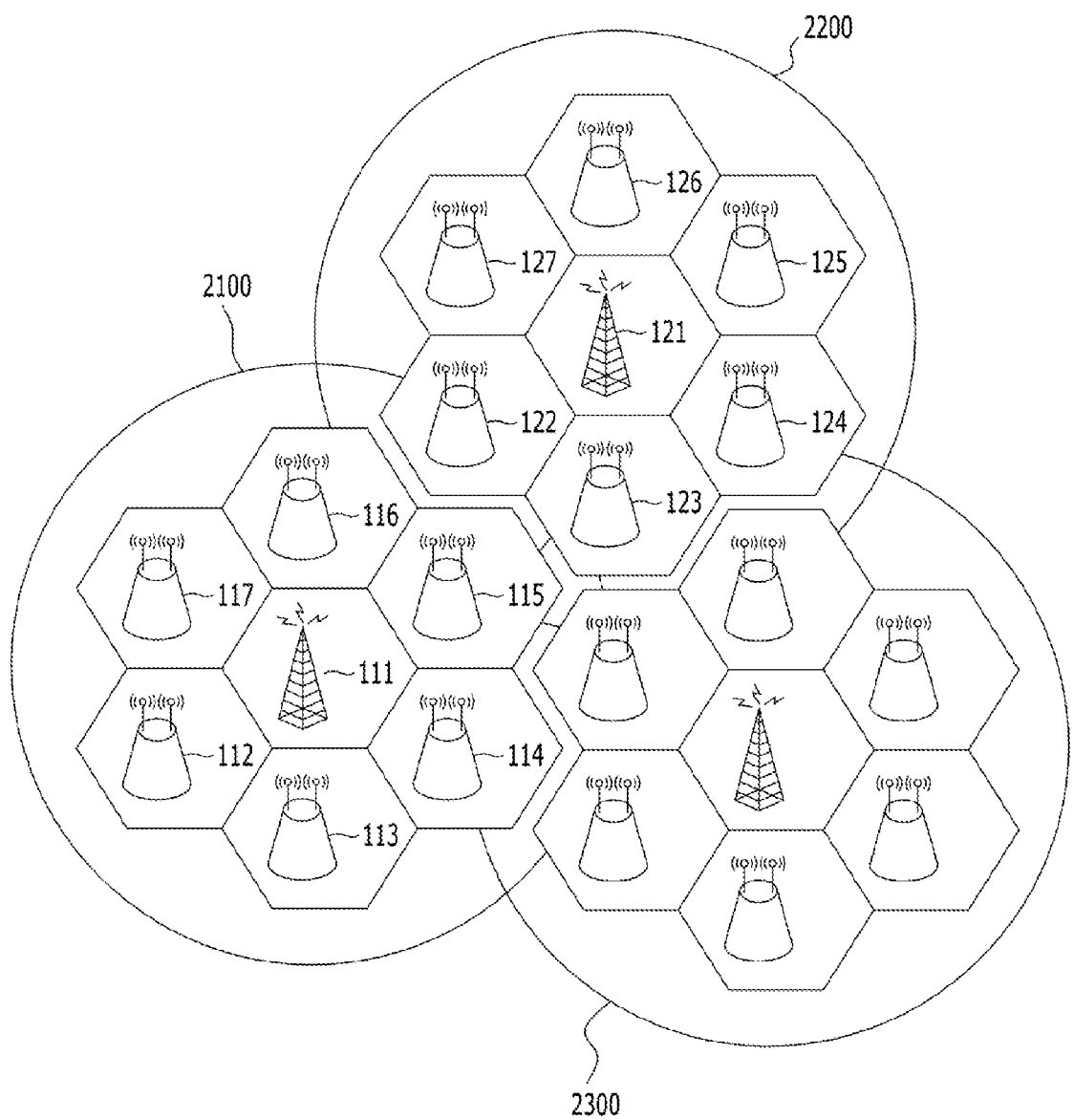
FIG. 2 shows a cell structure in accordance with at least one embodiment of the present invention.

FIG. 2 shows a cell structure in accordance with at least one embodiment of the present invention.

Referring to FIG. 2, network 10 may include a plurality of cells 2100, 2200, and 2300. Each one of cells 2100, 2200, and 2300 may include one macro radio unit and a plurality of cooperative radio units. For example, cell 2100 may include macro radio unit 111 and a plurality of cooperative radio units 112, 113, 114, 115, 116, and 117. Furthermore, cell 2200 may include macro radio unit 121 and a plurality of cooperative radio units 122, 123, 124, 125, 126, and 127. The cell structure of cell 2100 will be representatively described, hereinafter. Cell 2200 and cell 2300 may have the similar cell structure of cell 2100.

As described, cell 2100 may include macro radio unit 111 and a plurality of cooperative radio units 112, 113, 114, 115, 116, and 117. Macro radio unit 111 may manage overall communication processes in cell 2100. Macro radio unit 111 may be operated as a repeater mode and a typical sector mode. Macro radio unit 111 may always duplicate a signal and transmit the duplicated signals in the repeater mode. Macro radio unit 111 may transmit a signal to all user equipment located within cell 2100 with high transmission power.

Cooperative radio units 112 to 117 may transmit and receive signals to/from one or more user equipment located within a comparatively short distance therefrom. Cooperative radio units 112 to 117 may transmit signals with transmission power smaller than that of macro radio unit 111. Cooperative radio units 112 to 117 may transmit signals when required.

Such macro radio unit 111 and plurality of cooperative radio units 112 to 117 may be controlled by corresponding digital unit 20. In accordance with at least one embodiment of the present invention, digital unit 20 may control and manage macro radio unit 111 and cooperative radio units 112 to 117 in the same cell in order to efficiently use radio resources and to maximize radio capacity.

As shown, one cell may include at least one macro radio unit and a plurality of cooperative radio units. All radio units included in each cell may be controlled by coupled digital unit 20. Such radio units 111 to 117 may transmit a various types of radio signals. The radio signals may include a control signal, a data signal, and a reference signal. The control signal may use to inform system information and data channel allocation information. The data signal may be used to transmit user data. The reference signal may be used for frequency scheduling and channel estimation. The reference signal may be a pilot signal. Such reference signal may be used to recover data.

In the same cell, a plurality of cooperative radio units and a macro radio unit may transmit the same control signal and the same reference signals. For example, in cell 2200, cooperative radio units 122 to 126 may transmit control signals and reference signals, which are identical to those transmitted from macro radio unit 121. Radio units in one cell may transmit a control signal and a reference signal, different from those transmitted from radio units in the other cells. For example, radio units 121 to 127 in cell 2200 may transmit control signals and reference signals, which are different from those transmitted from radio units 111 to 117 in cell 2100. As described, the cell may include a plurality of cooperative radio units as well as a macro radio unit. Accordingly, user equipment may effectively receive a control signal and a reference signal, which are commonly transmitted from a plurality of radio units in the same cell.

As shown in FIG. 1 and FIG. 2, multiple radio units are spatially separated from a corresponding digital unit. Such cell design may reduce dead-spaces and/or holes in coverage for providing related communication services to user equipment but may not maximize system capacity. In order to maximize system capacity such as system data rates, multiple input and multiple output (MIMO) might be employed based on orthogonal frequency division multiplexing (OFDM). In accordance with at least one embodiment of the present invention, a radio unit may include multiple antennas for supporting MIMO in order to maximize system capacity. Particularly, a radio unit may include two antennas for supporting 2×2 MIMO. For the 2×2 MIMO, a radio unit may use a different reference signal pattern for each antenna. In a long term evolution (LTE) network, resources such as OFDM symbols are allocated with different patterns for transmitting a reference signal through each antenna.

Figure 3:
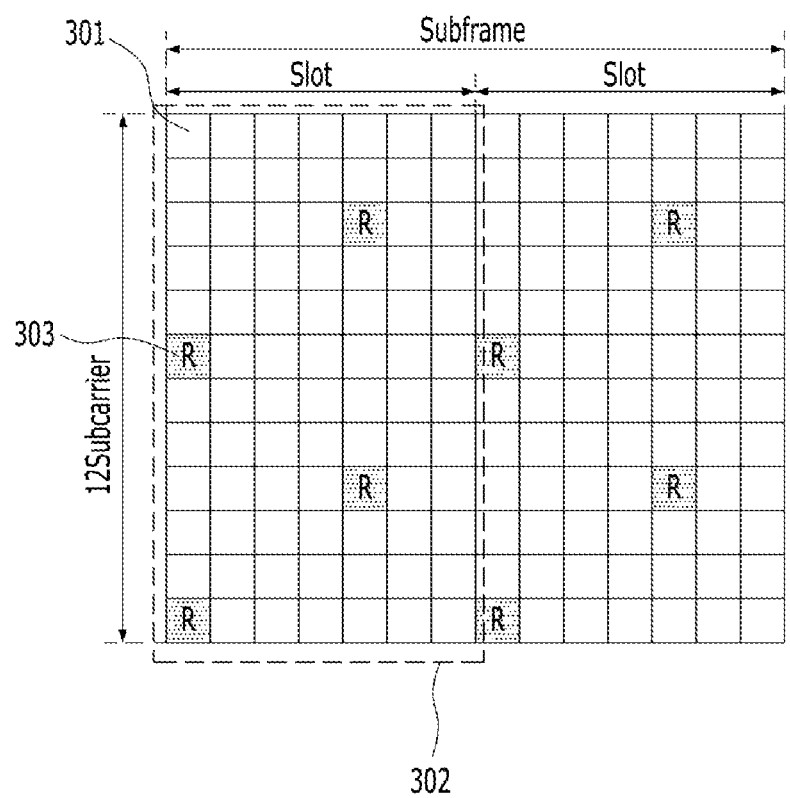
FIG. 3 shows OFDM symbols in a resource grid form.

FIG. 3 shows OFDM symbols in a resource grid form.

As shown in FIG. 3, OFDM symbols may be represented by a resource grid in a time and frequency dimension. Each box 301 in the resource grid denotes a single subcarrier for one symbol period. Such box 301 may be referred to as a resource element. The resource element may be the smallest element of resource allocation. A resource block 302 may be a minimum resource allocation unit. For example, a bandwidth of about 10 MHz may include about 50 resource blocks. Each resource block may be about 0.5 ms. Two resource blocks are allocated as one subframe (about 1 ms), each resource lock corresponding to a slot. The first three symbols may be transmitted as a control channel for informing resource allocation information. In such configuration, reference symbols 303 such as reference signals are transmitted every sixth subcarrier.

Figure 4:
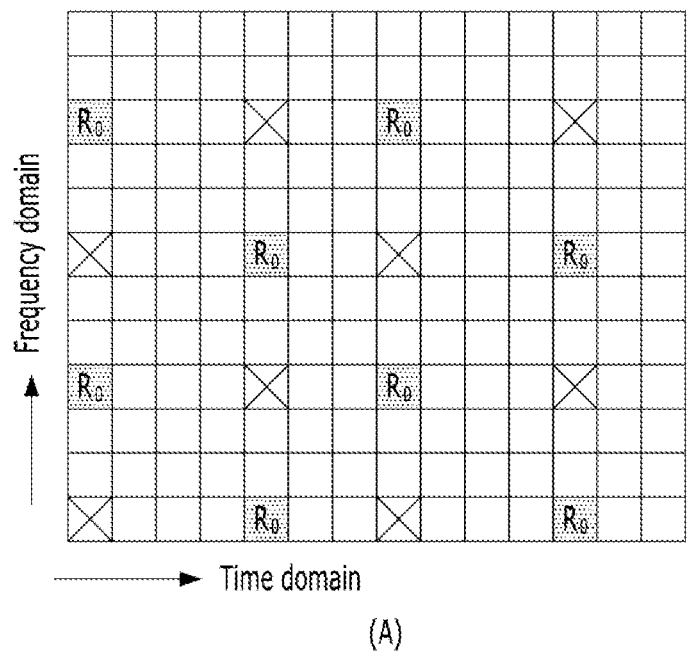
FIG. 4 shows resource elements allocated for a first antenna in order to transmit a reference signal and for a second antenna in order to transmit a reference signal when a radio unit includes two antennas for supporting 2×2 MIMO.
Figure 4:
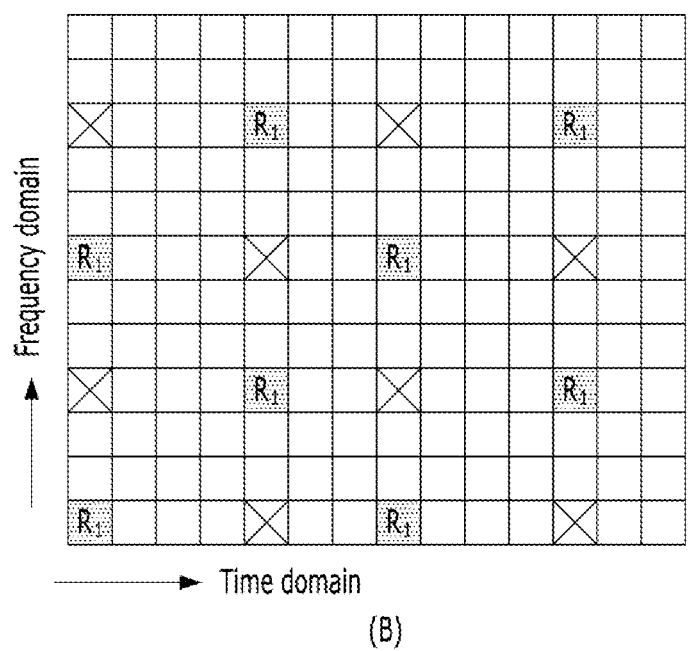

FIG. 4 shows resource elements allocated for a first antenna in order to transmit a reference signal and for a second antenna in order to transmit a reference signal when a radio unit includes two antennas for supporting 2×2 MIMO.

Referring to FIG. 4, resource elements are allocated with a different pattern for the first antenna and the second antenna of the radio unit for supporting 2×2 MIMO. As shown in a diagram (A) of FIG. 4, resource elements $R_0$ are allocated for transmitting a reference signal through the first antenna. As shown in a diagram (B) of FIG. 4, resource elements $R_1$ are allocated for transmitting a reference signal through the second antenna. Radio units may transmit reference signals with different patterns through each one of antennas as shown in FIG. 4.

In accordance with at least one embodiment of the present invention, radio units included in the same cell may transmit a reference signal with the same reference signal pattern for each antenna. Referring back to FIG. 2, radio units 111 to 117 in cell 2100 may use resource elements $R_0$ for transmitting a reference signal through the first antenna. Furthermore, radio units 111 to 117 in cell 2100 may use resource elements $R_1$ for transmitting a reference signal through the second antenna. Each one of radio units 111 to 117 included in the same cell 2100 may transmit a data signal using the same channel or using different channels. Cooperative radio units 112 to 117 may transmit a data signal using the same channel that the macro radio unit 116 uses.

Positions of resource blocks for transmitting a reference signal in each cell may differ according to a physical cell identity (PCI) of a cell. Particularly, the positions of resource blocks for a reference signal may be shifted according to Eq. 1 below.

$$V_{shift} = N_{ID}^{cell} \bmod 6 \quad \text{Eq. 1}$$

In Eq. 1, $N_{ID}^{cell}$ denotes the PCI. Based on Eq. 1, resource elements $R_0$ and $R_1$ of FIG. 4 may be used for transmitting a reference signal when a PCI of a cell is a multiple of six. When PCI is (multiple of 6)+1, resource elements for a reference signal may be shifted one block upwardly as compared to resource elements $R_0$ and $R_1$. When PCI is (multiple of 6)+2, resource elements for a reference signal may be shifted two blocks upwardly as compared to resource elements $R_0$ and $R_1$. When PCI is (multiple of 6)+3, resource elements for a reference signal may be shifted three blocks upwardly as compared to resource elements $R_0$ and $R_1$. That is, when PCI is (multiple of 6)+3, the same resource elements $R_0$ and $R_1$ may be used for transmitting a reference signal. For example, when adjacent cells have PCI of 1, 4, or 7, all of adjacent cells may use the same resource elements for transmitting a reference signal. In this case, reference signals of the adjacent cells may interfere with each other.

Figure 5:
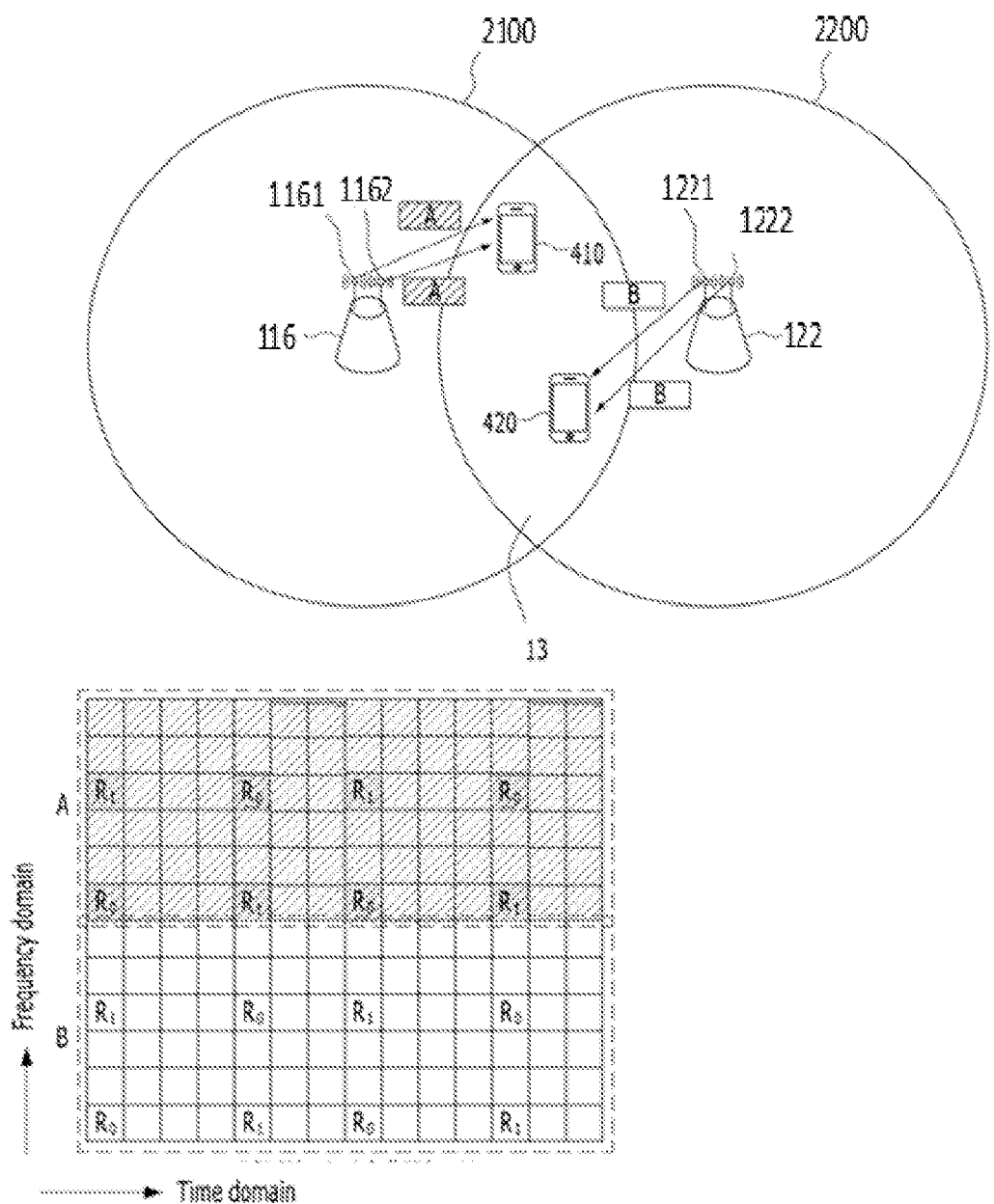
FIG. 5 shows radio units each having two antennas transmitting signals to user equipment in overlapping area of cells in accordance with at least one embodiment of the present invention.

FIG. 5 shows radio units each having two antennas transmitting signals to user equipment in overlapping area of cells in accordance with at least one embodiment of the present invention.

Referring to FIG. 5, cells 2100 and 2200 are adjacent to each other and include overlapping cell area 13. Cell 2100 may include radio unit 116 and cell 2200 may include radio unit 122. Overlapping cell area 13 may be referred to as a boundary area of cell 2100 and cell 2200. In such overlapping area 13, user equipment 410 and 420 may be located. In this case, radio unit 116 may provide a related service to user equipment 410 and radio unit 122 may provide a related service to user equipment 420.

For supporting 2×2 MIMO, each one of radio units 116 and 122 may include two antennas. For example, radio unit 116 may include first antenna 1161 and second antenna 1162. Radio unit 122 may include first antenna 1221 and second antenna 1222. Radio unit 116 may transmit the same signal to user equipment 410 through two antennas 1161 and 1162 each using a different reference signal pattern. That is, radio unit 116 may transmit the same signal with different reference signals to user equipment 410 through two antennas 1161 and 1162. Similarly, radio unit 122 may transmit the same signal to user equipment 410 using two antennas 1221 and 1222 each using a different reference signal pattern. That is, radio unit 122 may transmit the same signal to user equipment 420 with the different reference signal through two antennas 1221 and 1222 in accordance with at least one embodiment of the present invention.

When a PCI of cell 2100 is X and a PCI of cell 2200 is one of X+3 and X+6 where X is an integer number, radio units 116 and 122 may use the same reference signal pattern for transmitting a reference signal because the positions of reference signal resource blocks are decided based on a PCI of a cell. Accordingly, radio units 116 and 122 may use the same resource elements to transmit the reference signals as shown in FIG. 6.

Figure 6:
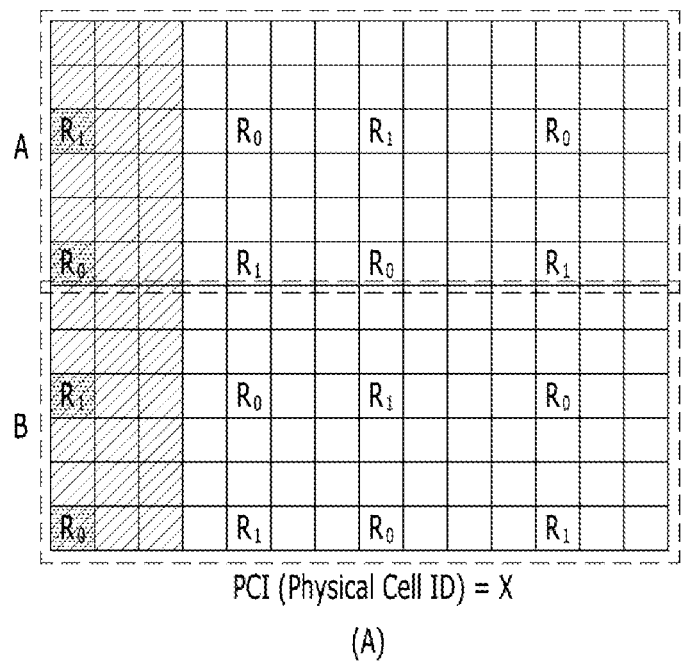
FIG. 6 shows resource elements for transmitting signals at a radio unit in accordance with at least one embodiment of the present invention.
Figure 6:
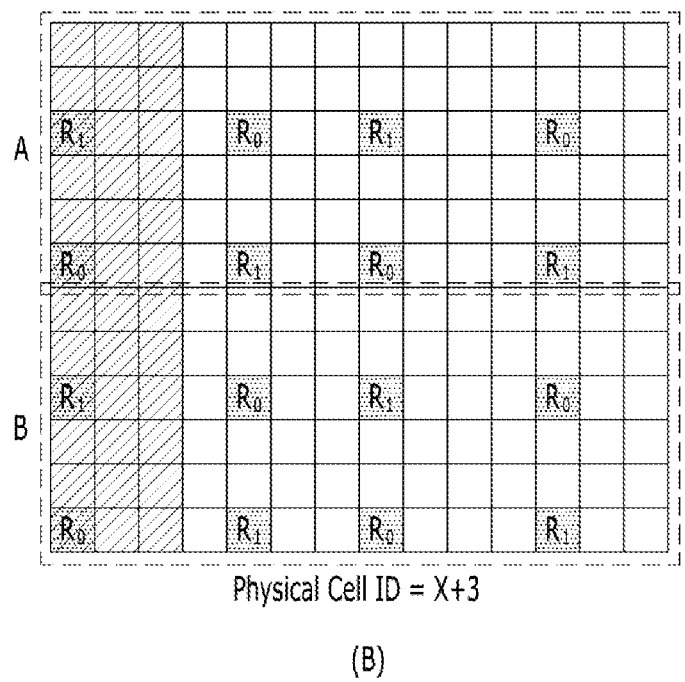

FIG. 6 shows resource elements for transmitting signals at a radio unit in accordance with at least one embodiment of the present invention.

Referring to FIG. 6, when one cell has a PCI of X and the other cell has a PCI of X+3, radio units in both cells may be allocated with the same resource blocks $R_1$ and $R_0$ to transmit reference signals as shown in a diagram (A) and a diagram (B) of FIG. 6. For example, radio unit 116 may transmit a signal to user equipment 410 through first and second antennas 1161 and 1162 using the reference signal patterns $R_0$ and $R_1$, as shown in the diagram (A). Radio unit 122 may transmit a signal to user equipment 420 through first and second antennas 1221 and 1222 using the reference signal patterns $R_0$ and $R_1$ as shown in the diagram (B).

Due to the same reference signal patterns, signals transmitted from radio unit 116 may be interfered with by signals transmitted from radio unit 122. In order to prevent such signal interference, radio units 116 and 122 may use different resource blocks to transmit signals to user equipment 410 and 420 located in overlapping area 13. Such resource block may be referred to as a channel. For example, radio unit 116 may use a resource block A such as channel A to transmit a signal to user equipment 410 and radio unit 211 may use a resource block B such as a channel B to transmit a signal to user equipment 420.

Although the difference resource blocks A and B are used to transmit signals in two adjacent cells, radio units might still have a signal interference problem because the radio units in two adjacent cells use the same resource elements to transmit the reference signals. For example, radio unit 116 in cell 2100 use a resource block A to transmit a signal to user equipment 410. Radio unit 122 in cell 2200 may use the resource block B to transmit a signal to user equipment 410 and use the resource block A to transmit a signal to user equipment 420. In this case, a reference signal transmitted from radio unit 116 to user equipment 410 using the resource block A might be interfered with a reference signal transmitted from radio unit 122 to user equipment 420 using the same resource block A in cell 2200.

In order to reduce such interference between reference signals in two adjacent cells, a transmission power for transmitting a reference signal may be controlled in accordance with at least one embodiment of the present invention. Such transmission power control will be described with reference to FIG. 7.

Figure 7:
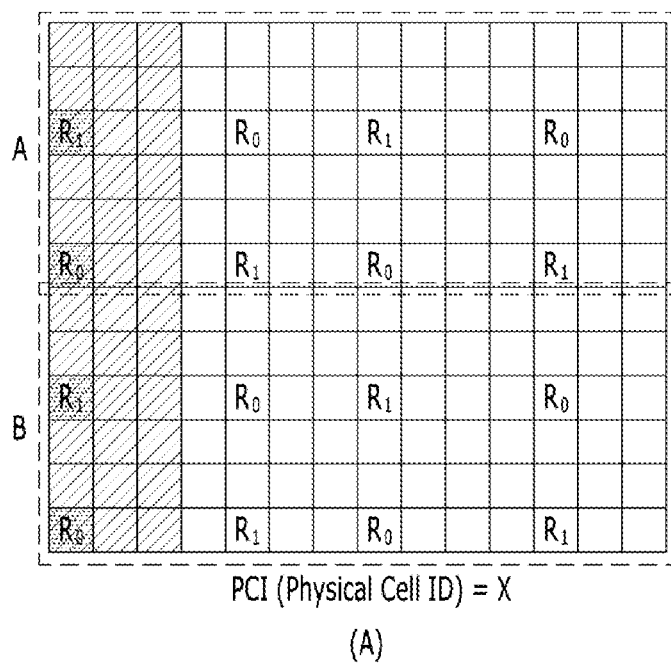
FIG. 7 shows resource elements for transmitting signals to multiple user equipment location in an overlapping cell area of radio units in accordance with at least one embodiment of the present invention.
Figure 7:
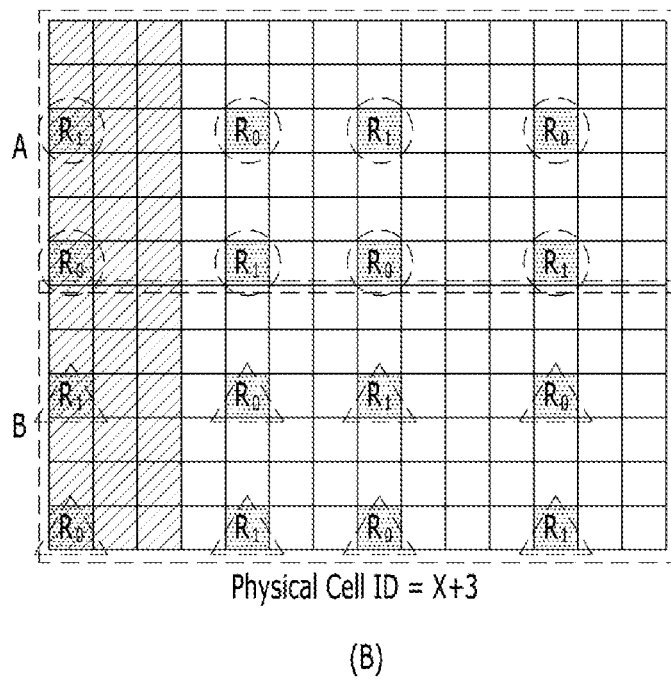

FIG. 7 shows resource elements for transmitting signals to multiple user equipment location in an overlapping cell area of radio units in accordance with at least one embodiment of the present invention.

Referring to FIG. 7, diagram (A) shows resource elements used by radio units in cell 2100 for transmitting reference signals and data signals to user equipment in an overlapping service are of cells 2100 and 2200. Diagram (B) shows resource elements used by radio units in cell 2200 for transmitting reference signals and data signals to user equipment in an overlapping service are of cells 2100 and 2200. Particularly, cell 2100 has a PCI of X and cell 2200 has a PCI of X+3, where X is an integer number. Due to the PCIs of two cells 2100 and 2200, the same resource elements are used for transmitting reference signals as shown in diagrams (A) and (B). Accordingly, reference signals may be interfered. In order to reduce reference signal interference, a digital unit may control radio units in adjacent cells to transmit reference signals with different transmission power. Particularly, when radio units in adjacent cells uses the same resource blocks to transmit signal, a coupled digital unit may control one of the radio units to transmit reference signals with comparatively low transmission power.

For example, radio unit 116 in cell 2100 uses a resource block A to transmit signals to user equipment in overlapping cell area 13 as shown in the diagram (A) of FIG. 7. When radio unit 122 in cell 2200 use the same resource block A to transmit signals to another user equipment in overlapping cell area 13, digital unit 20 may control radio unit 122 to transmit reference signals with comparatively low transmission power. As shown in the diagram (B) of FIG. 7, resource elements for reference signals are marked with circles in the resource block A. That is, when radio unit 116 in cell 2100 uses the same resource block A to transmit signals and when radio unit 122 in cell 2200 uses such circled resource elements in the same resource block A to transmit the reference signals, digital unit 20 may control radio unit 122 to transmit the reference signals with comparatively low transmission power in accordance with at least one embodiment of the present invention. For example, the transmission power of radio unit 122 for transmitting the reference signals of the resource block A may be lower than that of radio unit 116 for transmitting reference signals of the same resource block A.

Furthermore, digital unit 20 may control radio unit 122 to transmit reference signals of other resource blocks with comparatively high transmission power in order to compensate the decrease in the transmission power for transmitting reference signals of the resource block A. For example, when radio unit 122 transmits the reference signals of the resource block A with the comparatively low transmission power, digital unit 20 may control radio unit 122 to transmit reference signals of the resource block B with the comparatively high transmission power. As shown in a diagram (B) of FIG. 7, when radio unit 122 uses resource elements $R_1$ and $R_0$ marked with a triangle in the resource block B to transmit a reference signal, the reference signals are transmitted with a comparatively high transmission power in order to compensate the decrement of the reference signal strength in the resource block A. Accordingly, overall signal strength of reference signals in cell 2200 may be maintained uniformly. User equipment may also maintain received signal reference power (RSRP) uniformly. In order to perform such compensation process, a frequency selectivity scheduling process may be performed. The frequency selectivity scheduling process may compensate the decrement of signal strength based on the signal strength of each reference signal or each band. For example, a channel state of each resource block may be measured. The frequency selectivity scheduling process may select a resource block having signal strength that can compensate the decrease, termed decrement $\Delta$, of a reference signal and allocate the selected resource block. Accordingly, the decrement $\Delta$ of the reference signal strength may be compensated.

Such transmission power control may reduce interference between reference signals transmitted from radio unit 116 in cell 2100 and reference signals transmitted from radio unit 122 in cell 2200 when radio unit 116 and radio unit 122 in different cells use the same resource blocks for transmitting signals. Accordingly, channel estimation for a reference signal may be optimized and radio units may effectively transmit signals.

As described, a transmission power for transmitting a reference may be controlled when a radio unit transmits a signal to user equipment located at an overlapping cell area of two adjacent cells in accordance with at least one embodiment of the present invention. Hereinafter, such method will be described with reference to FIG. 8.

Figure 8:
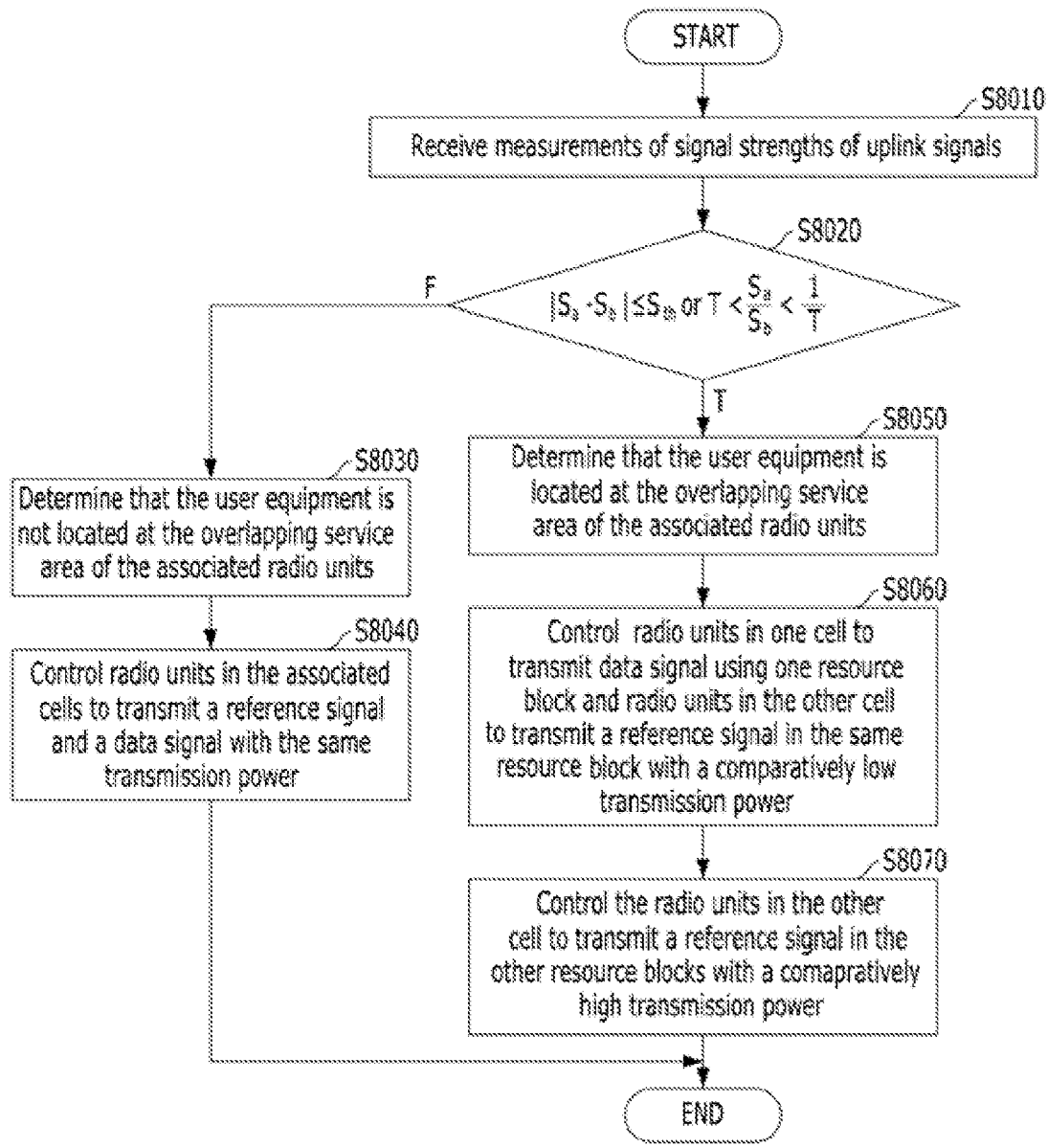
FIG. 8 shows a method for controlling transmission power for transmitting a reference signal in accordance with at least one embodiment of the present invention.

FIG. 8 shows a method for controlling transmission power for transmitting a reference signal in accordance with at least one embodiment of the present invention.

Referring to FIG. 8, at step S8010, a digital unit may receive signal strengths of uplink signals from user equipment to radio units coupled to the digital unit. For example, each one of radio units 116 to 122 may measure signal strengths of signals transmitted from user equipment in a corresponding service area and transmit the measured signal strengths to digital unit 20. Particularly, radio units 116 and 122 each measure signal strength of an uplink signal transmitted from user equipment 410. Radio units 116 and 122 may transmit the measured signal strengths to digital unit 20. That is, radio unit 116 may transmit a signal strength value $S_a$ and radio unit 122 may transmit a signal strength value $S_b$ to digital unit 20. Here, the signal strength value $S_a$ may denote the measurement of signal strength of an uplink signal transmitted from user equipment 410 to radio unit 116. The signal strength value $S_b$ may denote measurement of signal strength of an uplink signal transmitted from user equipment 420 to radio unit 122.

At step S8020, the digital unit may compare the collected signal strengths associated with the same user equipment with a predetermined threshold. For example, digital unit 20 may receive the signal strength values $S_a$ and $S_b$ associated with user equipment 410, respectively from radio units 116 and 122. Digital unit 20 may determine whether user equipment 410 is located in an overlapping cell area of radio units 116 and 122 based on the signal strength values $S_a$ and $S_b$ with the predetermined threshold $S_{th}$ in accordance with at least one embodiment of the present invention. The predetermined threshold $S_{th}$ may be decided based on various factors, such as a capacity of a wireless communication system. For example, digital unit 20 may use Eq. 2 below.

$$|S_a - S_b| \leq S_{th} \qquad \text{Eq. 2}$$

Eq. 2 is used when the signal strength is measured in a unit of dB. When the signal strength is measured in a unit of mW, Eq. 3 below may be used to determine whether user equipment is located in an overlapping cell area. In Eq. 3, T may denote a predetermined threshold.

$$T < \frac{S_a}{S_b} < \frac{1}{T}, \text{ where } 0 < T < 1 \qquad \text{Eq. 3}$$

At step S8030, the digital unit may determine that the user equipment is not located at the overlapping cell area of the associated radio units when the difference between the two received signal strengths $S_a$ and $S_b$ is greater than the predetermined threshold $S_{th}$(F-S7020). When Eq. 3 is used, the digital unit may determine that the user equipment is not located at the overlapping cell area of the associated radio units when a ratio of the measured signal strength values $S_a$ and $S_b$ is not between T and 1/T.

For example, when one of radio units 116 and 122 is much closer to user equipment 410, the difference between the two received signal strengths $S_a$ and $S_b$ is greater than the predetermined threshold $S_{th}$. Accordingly, user equipment 410 is not located in the overlapping cell area of radio units 111 and 112.

At step S8040, the digital unit may control ratio units to transmit signals with equal transmission power. For example, digital unit 20 may control radio units 116 and 122 to transmit reference signals of different resource blocks with the same transmission power.

At step S8050, the digital unit may determine that the user equipment is located at the overlapping cell area of the associated radio units when the difference between the two received signal strengths $S_a$ and $S_b$ is not greater than the predetermined threshold $S_{th}$ (T-S7020). For example, when user equipment 410 is located in the overlapping cell area of radio units 111 and 112, the difference between the two received signal strengths $S_a$ and $S_b$ is not greater than the predetermined threshold $S_{th}$. That is, user equipment 410 may be separated at about the same distance from radio units 111 and 112.

Furthermore, the digital unit may determine that the user equipment is located at the overlapping cell area of the associated radio units when a ratio of the measured signal strength values $S_a$ and $S_b$ is between T and 1/T.

At step S8060, the digital unit may control radio units in one cell to transmit signals to user equipment using one resource block and control radio units in the other cell to transmit reference signals of the same resource block to user equipment with a comparatively low transmission power. The comparatively low transmission power may be lower than a transmission power for transmitting a reference signal in the radio units in the one cell. For example, when user equipment 410 is located at overlapping cell area 13 of cells 2100 and 2200, digital unit 20 may control radio unit 116 in cell 2100 to transmit signals using a resource block A and control radio unit 122 in cell 2200 to transmit reference signals of the same resource block A with a comparatively low transmission power. In this case, radio unit 122 may transmit the reference signals of the same resource block A with a transmission power lower than a transmission power used for radio unit 116 for transmitting a reference signal.

At step S8070, the digital unit may control the radio units in the other cell to transmit reference signals of the other resource blocks with a comparatively high transmission power. For example, digital unit may control radio unit 122 in cell 2200 to transmit reference signals of the other resource blocks such as a resource block B with a comparatively high transmission power. Accordingly, overall transmission power of transmitting reference signals may be maintained in the same transmission power.

As described above, transmission power for transmitting reference signals may be controlled differently in order to reduce interference between reference signals transmitted from adjacent cells in accordance with at least one embodiment of the preset invention. Hereinafter, an apparatus for differently controlling transmission power of a reference signal in accordance with at least one embodiment of the present invention will be described with reference to FIG. 9. For convenience and ease of understanding, the apparatus will be described as an independent device for performing the transmission power control operation with reference to FIG. 9. The present invention, however, is not limited thereto. For example, the apparatus may be included in a digital unit coupled to a plurality of radio unit.

Figure 9:
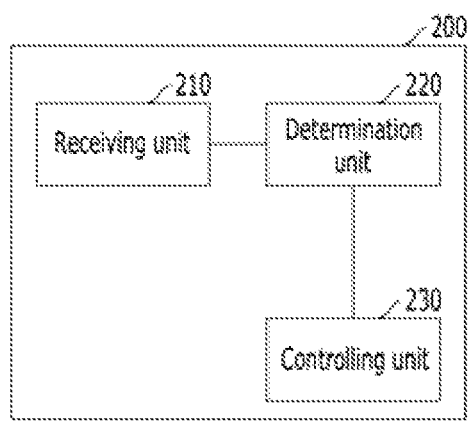
FIG. 9 shows an apparatus for differently controlling transmission power of a reference signal in accordance with at least one embodiment of the present invention.

FIG. 9 shows an apparatus for differently controlling transmission power of a reference signal in accordance with at least one embodiment of the present invention.

Referring to FIG. 9, apparatus 200 may include receiving unit 210, determination unit 220, and controlling unit 230 in accordance with at least one embodiment of the present invention.

Receiving unit 210 may receive radio signals from radio units in adjacent cells, such as radio units 116 and 122. The radio signal may include signal strength values of uplink signals between radio units 116 and 122 and user equipment 410 and 420, which are located in overlapping cell area 13 of cells 116 and 122 where radio units 116 and 122 are located, respectively.

Determination unit 220 may determine whether user equipment 410 and 420 are located in overlapping cell area 13 of radio units 116 and 122. In order to determine, determination unit 220 may consider the received signal strength values from radio units 116 and 122. Particularly, one of Eq. 2 and Eq. 3 may be used to determine whether user equipment 410 and 420 are located in overlapping cell area.

Controlling unit 230 may control transmission power of radio units 116 and 122 for transmitting data signals and reference signals based on the determination result of determination unit 220. For example, when determination unit 220 determines that user equipment 410 and 420 are located at the overlapping cell area of radio units 116 and 122, controlling unit 230 may control radio units 116 and 122 to transmit reference signals with different transmission power.

That is, when radio unit 116 in cell 2100 to transmit data to user equipment 410 using a resource block A, controlling unit 230 may control radio unit 122 in cell 2200 to transmit reference signals of the same resource block A with a comparatively low transmission power. The transmission power of the reference signal may be decided based on a frequency selectivity schedule policy or a wireless communication system policy. Furthermore, controlling unit 230 may control radio unit 122 in cell 2200 to transmit reference signals of the other resource blocks such as a resource block B with a comparatively high transmission power. The transmission power of the reference signal in the resource block B may be determined based on a frequency selectivity scheduling scheme.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a controlling unit, a controlling unit, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose controlling unit, the program code segments combine with the controlling unit to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling radio units to transmit a signal to user equipment wherein each one of the radio units includes at least two antennas associated with a different transmission pattern, the method comprising:
   determining whether user equipment is located at an overlapping cell area of a first cell and a second cell; and
   when the user equipment is determined as being located in the overlapping cell area, controlling a first radio unit in the first cell to transmit a signal to the user equipment using a first resource block and simultaneously controlling a second radio unit in the second cell to transmit a reference signal associated with the first resource block, wherein the first radio unit is controlled to use a first transmission power to transmit the signal, the second radio unit is controlled to use a second transmission power to transmit the reference signal, and the second transmission power is lower than the first transmission power, and wherein the method further comprises controlling the second radio unit to transmit a reference signal associated with other resource blocks with a third transmission power, wherein the third transmission power is higher than at least one of the second transmission power and the first transmission power.

2. The method of claim 1, wherein the controlling the second radio unit to transmit a reference signal in other resource blocks with a third transmission power includes performing a frequency selectivity scheduling process.

3. The method of claim 1, wherein the first cell and the second cell employ a same resource element pattern for transmitting a reference signal.

4. The method of claim 1, wherein the first cell has a physical cell identity (PCI) of X and the second cell has a PCI of X+3, X an integer number.

5. The method of claim 1, wherein the determining includes:
receiving a signal strength value Sa of an uplink signal between the user equipment and the first radio unit in the first cell;
receiving a signal strength value Sb of an uplink signal between the user equipment and the second radio unit in the second cell;
comparing a difference of the signal strength values Sa and Sb with a predetermined threshold Sth; and
determining whether the user equipment is located in the overlapping cell area of the first radio unit and the second radio unit based on the comparison result.

6. The method of claim 5, wherein the determining includes:
determining that the user equipment is located in the overlapping cell area when the difference is smaller than the predetermined threshold Sth; and
determining that the user equipment is not located in the overlapping cell area when the difference is greater than the predetermined threshold Sth.

7. The method of claim 1, wherein the determining includes:
receiving a signal strength value Sa of an uplink signal between the user equipment and the first radio unit in the first cell;
receiving a signal strength value Sb of an uplink signal between the user equipment and the second radio unit in the second cell;
determine whether a ratio of the signal strength values Sa and Sb is in between T and 1/T, T a predetermined threshold; and
determining whether the user equipment is located in the overlapping cell area of the first radio unit and the second radio unit when the ratio of the signal strength values Sa and Sb is in between T and 1/T.

8. The method of claim 1, comprising:
controlling the first radio unit in the first cell and the second radio unit in the second cell to transmit a reference signal to the user equipment with the same transmission power when the user equipment is determined as not located in the overlapping cell area of the first cell and the second cell.

9. The method of claim 1, wherein the first and second radio units transmit signals using resources based on at least one of orthogonal frequency division multiplexing (OFDM) and wideband code division multiple access (WCDMA).

10. An apparatus for controlling a plurality of radio units to transmit a signal to user equipment, where each of the plurality of radio units includes at least two antennas each associated with a different transmission pattern, the apparatus comprising:
at least one memory configured to store information for controlling the plurality of radio units;
a communication circuit configured to receive a signal strength value Sa of uplink signals between user equipment and a first radio unit in a first cell and to receive a signal strength value Sb of uplink signals between the user equipment and a second radio unit in a second cell; and
at least one processor configured to perform operations for controlling the plurality of radio units,
wherein the at least one processor includes
a determination unit configured to determine whether the user equipment is located at an overlapping cell area of the first cell and the second cell based on the received signal strength values Sa and Sb of uplink signals; and
a controlling unit configured to, when the user equipment is determined as being located in the overlapping cell area, control the first radio unit in the first cell to transmit a signal to the user equipment using a first resource block and to simultaneously control the second radio unit in the second cell to transmit a reference signal associated with the first resource block with a second transmission power, and
wherein the first radio unit is controlled to use a first transmission power to transmit the signal, the second radio unit is controlled to use a second transmission power to transmit the reference signal, and the second transmission power is lower than a first transmission power of the first radio unit in the first cell for transmitting a reference signal using the first resource block.

11. The apparatus of claim 10, wherein the controlling unit performs a frequency selectivity scheduling process for controlling the second radio unit to transmit the reference signal in the other resource block with the third transmission power.

12. The apparatus of claim 10, wherein the first cell and the second cell use same resource element pattern for transmitting a reference signal.

13. The apparatus of claim 10, wherein the first cell has a physical cell identity (PCI) of X and the second cell has a PCI of X+3, where X is an integer number.

14. The apparatus of claim 10, wherein the controlling unit is configured to:
control the first radio unit in the first cell and the second radio unit in the second cell to transmit a reference signal to the user equipment with the same transmission power when the user equipment is determined as not located in the overlapping cell area of the first cell and the second cell.

15. The apparatus of claim 10, wherein the controlling unit is configured to control the second radio unit to transmit a reference signal associated with other resource blocks with a third transmission power, wherein the third transmission power is higher than at least one of the second transmission power and the first transmission power.

16. A radio unit included in a first cell, the radio unit configured to:
include at least two antennas each associated with a different transmission pattern; and transmit a reference signal associated with a first resource block with a first transmission power to user equipment located in an overlapping area of the first cell and a second cell when a second radio unit in the second cell transmit signals to the user equipment using the first resource block, wherein the radio unit is controlled to use the first transmission power to transmit the reference signal to the user equipment, the second radio unit is controlled to use a second transmission power to transmit the signals to the user equipment, and the first transmission power is lower than the second transmission power, and wherein the radio unit is configured to transmit a reference signal associated with other resource blocks with a third transmission power, wherein the third transmission power is higher than at least one of the first transmission power and the second transmission power.

17. The radio unit of claim 16, wherein the radio unit is configured to:

transmit signals to the user equipment using a resource element pattern identical to that used by the second radio unit in the second cell.

18. The radio unit of claim 16, wherein the first cell has a physical cell identity (PCI) of X and the second cell has a PCI of X+3, where X is an integer number.

* * * * *